INVENTORS.
JULIUS S. MORGAN
ROBERT H. LEE
BY
ATTORNEY

INVENTORS.
JULIUS S. MORGAN
ROBERT H. LEE
BY
ATTORNEY

UnitedStates Patent Office 3,045,126
Patented July 17, 1962

3,045,126
PHASE-BALANCING CONTROL SYSTEMS FOR THREE-PHASE GENERATORS
Julius S. Morgan, Highland, Ill., and Robert H. Lee, Appleton, Wis., assignors to Basler Electric Company, Highland, Ill., a corporation of Illinois
Filed Dec. 4, 1961, Ser. No. 156,863
15 Claims. (Cl. 307—19)

This invention relates in general to certain new and useful improvements in control systems for three-phase generators.

In many types of three-phase power supply systems, it is highly desirable to maintain balanced three-phase voltages under conditions of unbalanced load. One conventional system for accomplishing this result consists of three single-phase generators which are driven by a single prime mover. An angularly adjustable coupling is provided between the single-phase generators in such manner that the phase of the output voltage from each generator can be shifted with respect to the output voltages of the other generators and, in addition, the several output voltages are independently regulated by conventional voltage regulating means. The phases are intended to be 120° apart. The error from 120° is detected in the output voltages and correction signals fed to a drive motor which corrects for the phase angle by readjusting the angular position of the shafts on the single-phase generators. In the event that the load shifts in such a manner that one generator is presented with a load reduction while another of the generators is presented with a load increase, automatic readjustment of the voltage and of the phase of each of these two generators is required. This system, however, is mechanically complicated, unreliable, and expensive.

Another system which has been commonly employed to maintain balanced three-phase voltages is one in which dummy loads are presented automatically to the generators in such a manner as to bring about a balance of output voltages and a balance in the three phases thereof. Ordinarily, the so-called "dummy load" consists of a saturable reactor in series with a power resistor. When the load on one phase is light, the output voltage tends to be high and it will be brought back to normal value by applying D.C. current to the control winding of the saturable reactor and thus provides the additional loading on such phase as may be required to bring about a voltage balance. This system is unsatisfactory, however, for the reason that the use of a saturable reactor across the output of the generator always introduces harmonic voltages into the output which are objectionable and usually must be filtered out. Moreover, the "dummy load" system can only bring about a balanced phase relationship when the power factor of the load presented to the heavily loaded phases of the generator is equal to the power factor of the dummy load. However, the power factor of the dummy load is always very low at light loads and tends to be high on heavy loads. Therefore, the "dummy load" system, at best, only partially attains a correction in the output of the generator.

The existing control systems for three-phase generators are not only mechanically complicated, expensive, and heavy in weight, but are also incapable of attaining an accuracy in phase regulation greater than approximately three percent. On the other hand, many applications, and particularly military applications, require an accuracy of plus or minus one-half percent. In other words, on a 450 v. three-phase system, it is often necessary to maintain regulation within a range of plus or minus 2.25 volts.

It is, therefore, the primary object of the present invention to provide a control system for three-phase generators which is capable of maintaining balanced three-phase voltages under conditions of unbalanced load with an extremely high degree of accuracy and reliability.

It is also an object of the present invention to provide a control system of the type stated which will introduce practically no significant degree of harmonic content in the output voltages.

It is another object of the present invention to provide a control system of the type stated which is relatively small and compact both in size and weight.

It is a further object of the present invention to provide a control system of the type stated in which the heat rise during periods of prolonged operation will be minor and the power losses relatively low.

It is an additional object of the present invention to provide a control system of the type stated which not only balances voltages with high efficiency, but also can accept a balanced load from the generator or can accept an unbalanced load and balance it.

With the above and other objects in view, our invention resides in the novel features of form, construction, arrangement, and combination of parts presently described and pointed out in the claims.

In the accompanying drawings—

Figure 1:
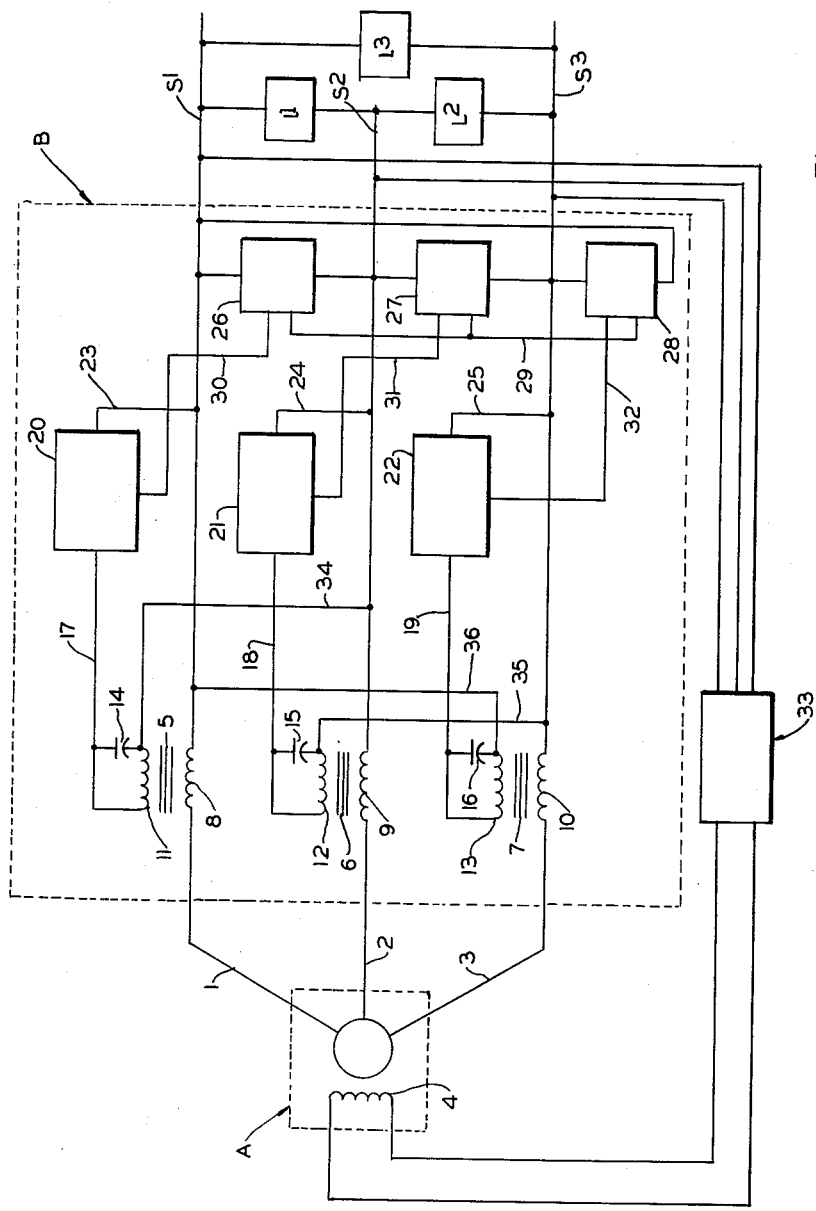
FIG. 1 is a schematic diagram of a generator control system constructed in accordance with and embodying the present invention, showing the control system in its simplest or most fundamental form.

Referring now in more detail and by reference characters to the drawings, which illustrate practical embodiments of the present invention, FIG. 1 illustrates a control system which provides for correction of the output voltage of a three-phase generator to any degree of accuracy desired and which introduces a negligible quantity of harmonic voltage into the output of the generator. As illustrated, A designates a conventional type of three-phase generator having three output lines 1, 2, 3. Also forming a part of the generator A is a conventional field winding 4. Since the present invention is applicable to any conventional type of three-phase generator, the details of the generator A are not shown or described specifically herein.

The control system generally designated in FIG. 1 by the reference character B comprises three transformers 5, 6, 7, having primary windings 8, 9, 10, respectively connected at one end to the generator output lines 1, 2, 3, and at the other end to supply lines $S^1$, $S^2$, $S^3$. The transformers 5, 6, 7, are each respectively provided with secondary windings 11, 12, 13, which are connected across capacitors 14, 15, 16. One end or terminal of the secondary windings 11, 12, 13, are respectively connected by conductors 17, 18, 19, to conventional line-to-line voltage-sensing control devices 20, 21, 22, which are, in turn, connected by conductors 23, 24, 25, to the supply lines $S^1$, $S^2$, $S^3$. Also connected across the supply lines $S^1$, $S^2$, $S^3$, in parallel with the loads $L^1$, $L^2$, $L^3$, are conventional voltage regulators 26, 27, 28, which are interconnected by a common conductor 29. Each of these voltage regulators will develop a signal which is proportional to the error in voltage balance between any two of the output lines 1, 2, 3. Such signals are transmitted along conductors 30, 31, 32, respectively, to the control devices 20, 21, 22. It should be noted that the signals are not dependent on the magnitude of the line voltage but on the differences between the line voltages. In addition to this, a voltage regulator 33 is also conventionally connected across the supply lines $S^1$, $S^2$, $S^3$, and to the field winding 4 of the generator A, all as best seen in FIG. 1.

The other ends or terminals of the secondary windings 11, 12, 13, are respectively connected to conductors 34, 35, 36, which are, in turn, connected to the supply lines $S^2$, $S^3$, and $S^1$, in that order. By proper control of the current flow through the control devices 20, 21, 22, the potential between the supply lines $S^1$-, $S^2$, $S^2$-, $S^3$, and $S^1$-$S^3$, may be maintained constant, regardless of the degree of unbalance created by electrically independent loads $L^1$, $L^2$, $L^3$. It should be noted that the secondary windings 11, 12, 13, may be connected either from line-to-line on the supply side of the control system or may be connected from line-to-line of the generator proper, it being the essential characteristic of the present invention that a source of current be provided to these secondary windings 11, 12, 13, in the proper phase and of the proper magnitude to provide the necessary corrections and that the control devices 20, 21, 22, be instantaneously capable of supplying such corrective current upon sensing the requirement therefor. The control devices 20, 21, 22, may be either resistive or reactive in character. The voltage regulator 33 may be of any conventional type and, therefore, is not shown or described in specific detail herein.

Figure 2:
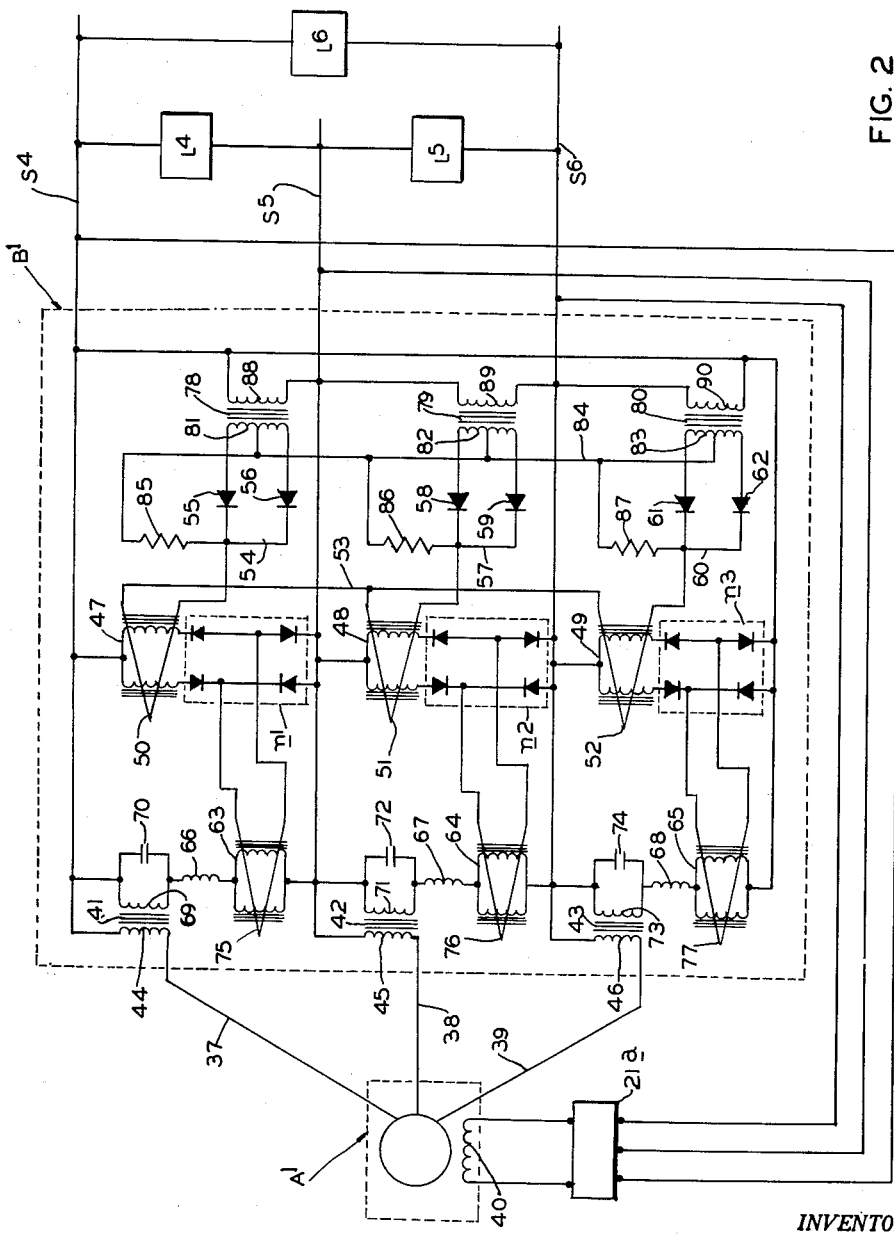
FIG. 2 is a schematic diagram of a control system constructed in accordance with and embodying the present invention specifically as applied to the control of line-to-line voltages.

FIG. 2 illustrates in more detail a line-to-line control system $B^1$ constructed in accordance with and embodying the present invention for maintaining accurate voltage and phase control of the output of a three-phase generator with line-to-line sensing of load-imbalance conditions. $A^1$ again designates a conventional three-phase generator having three output lines 37, 38, 39, and a field winding 40. The control system $B^1$ includes transformers 41, 42, 43, respectively, having primary windings 44, 45, 46, which are connected in series with the three output lines 37, 38, 39, and three supply line $S^4$, $S^5$, $S^6$, across which the several loads $L^4$, $L^5$, $L^6$, are connected in the usual manner. The supply lines $S^4$, $S^5$, $S^6$, are also connected to a conventional voltage regulator $21^a$ which is, in turn, connected across the field winding 40.

Forming a part of the control system are three magnetic amplifiers 47, 48, 49, which are, respectively, connected across the three phases of the generator output in the manner shown in FIG. 2 through rectifier networks $n^1$, $n^2$, $n^3$. The magnetic amplifiers 47, 48, 49, are, respectively, provided with control windings 50, 51, 52, and are connected in common at one end or terminal by a common conductor 53. The other end or terminal of the control winding 50 is connected to the common conductor 54 between the cathodes of the diodes 55, 56. Similarly, the other end or terminal of the control winding 51 is connected to the common conductor 57 between the cathodes of the diodes 58, 59. Finally, the other end or terminal of the control winding 52 is connected to the common conductor 60 between the cathodes of the diodes 61, 62.

Also forming a part of the control system $B^1$ are three saturable reactors 63, 64, 65, and three inductors preferably of the linear reaction type, 66, 67, 68. As shown in FIG. 2, the saturable reactor 63 and inductor 66 are connected in series with each other between supply line $S^5$ and one terminal of a secondary 69 of the transformer 41. The other terminal of the secondary 69 is connected to the supply line $S^4$ and a capacitor 70 is connected in parallel across said terminals. Similarly, the saturable reactor 64 and inductor 67 are connected in series with each other between supply line $S^6$ and one terminal of a secondary 71 of the transformer 42. The other terminal of the secondary 71 is connected to the supply line $S^5$ and a capacitor 72 is connected in parallel across said terminals. Finally, the saturable reactor 65 and inductor 68 are connected in series with each other between supply line $S^4$ and one terminal of a secondary 73 of the transformer 43. The other terminal of the secondary 73 is connected to the supply line $S^6$ and a capacitor 74 is connected in parallel across said terminals. The saturable reactors 63, 64, 65, are, respectively, provided with control windings 75, 76, 77, which are, fed by the output of the networks $n^1$, $n^2$, $n^3$. The output from the network $n^1$ controls the current flow through the saturable reactor 63 and the inductor 66. Similarly, the output of the network $n^2$ controls the current flow through the saturable reactor 64 and the inductor 67. Finally, the output of the network $n^3$ controls the current flow through the saturable reactor 65 and the inductor 68.

Also provided in the control system are three transformers 78, 79, 80, respectively, having center-tapped secondary windings 81, 82, 83, the center taps of which are connected by a common conductor 84. The opposite ends or terminals of the secondary windings 81, 82, 83, are, respectively, connected to diodes 55—56, 58—59, and 61—62. The cathodes of the diodes 55, 56, are connected by the common conductor 54 to one terminal of a bleeder resistor 85 which is, in turn, connected at its other end to the common conductor 84. Similarly, the cathodes of the diodes 58—59, are connected by the common conductor 57 to one terminal of a bleeder resistor 86 which is, in turn, connected at its other end to the common conductor 84. Likewise, the cathodes 61, 62, are connected by the common conductor 60 to one terminal of a bleeder resistor 87, which is, in turn, connected at its other end to the common conductor 84. Finally, the transformers 81, 82, 83, are provided with primary windings 88, 89, 90, which are connected respectively across the three phases represented by the supply lines $S^4$, $S^5$, $S^6$.

In order to explain the operation of the control system $B^1$, it may be assumed that a load is imposed between the supply lines $S^4$, $S^5$, and that no load is imposed between the lines $S^5$, $S^6$, or between the lines $S^4$, $S^6$. In a normal generator system under the assumed conditions, the potential between the supply lines $S^4$, $S^5$, will become substantially lower than the average potential between the three supply lines $S^4$, $S^5$, $S^6$.

Consequently, the D.C. potential across the bleeder resistor 85 becomes lower than the average of the three D.C. potentials across all three of the bleeder resistors 85, 86, 87, which average appears on the common conductor 53. Therefore, current flows from the diodes 58, 59, 61, 62, through the control windings 51, 52, in a positive direction and from diodes 55, 56, through the control winding 50 in a negative direction. The negative direction of current flow through the control winding 50 is arranged to cause an increased current to flow from the rectifier network $n^1$ of the magnetic amplifier 47 and, therefore, in increased current flows through the saturable reactor 63 and the inductor 66.

Figure 3:
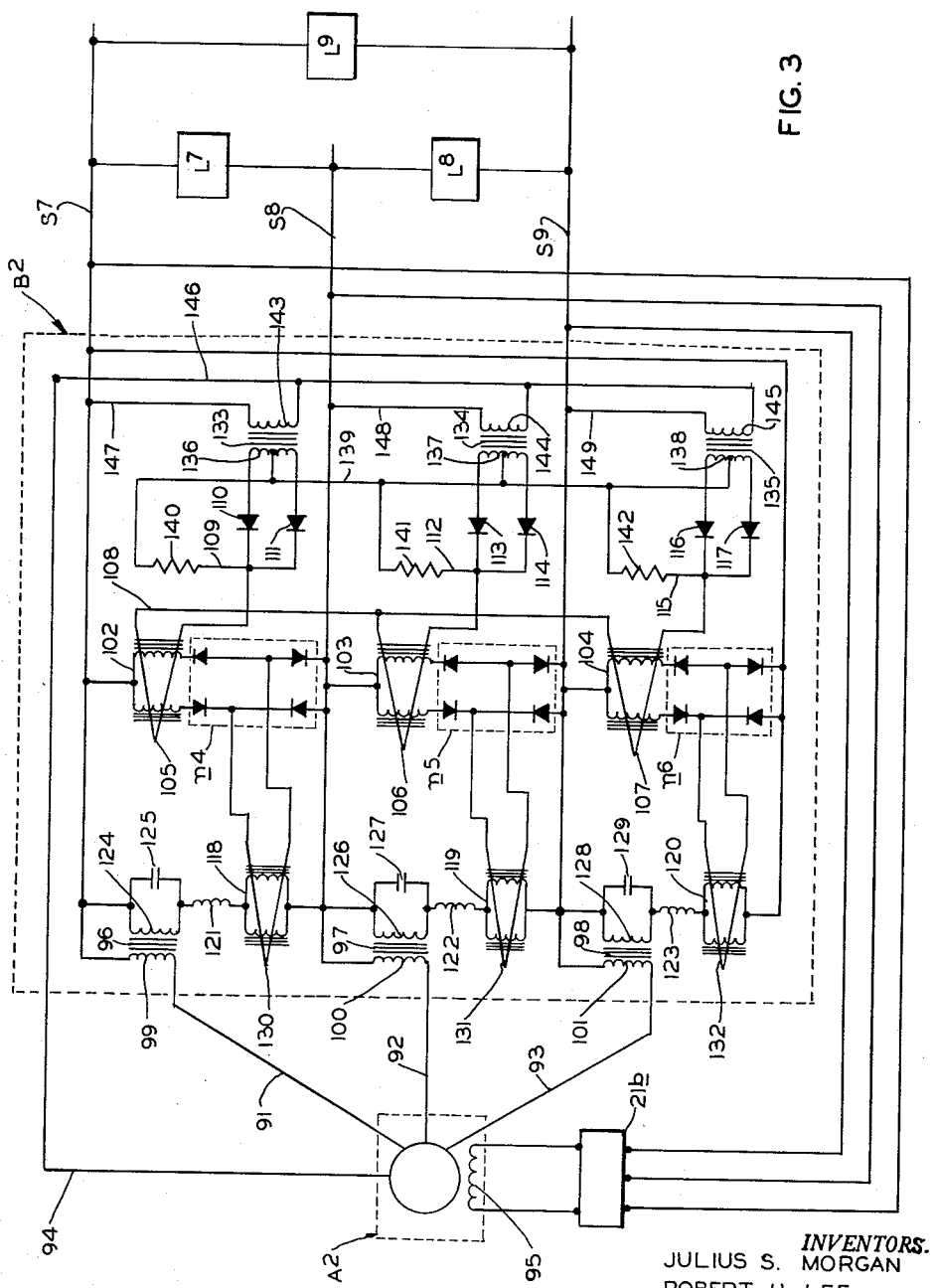
FIG. 3 is a schematic diagram of a control system constructed in accordance with and embodying the present invention as specifically applied to the control of line-to-neutral voltages.

FIG. 3 illustrates a modified form of control system $B^2$ constructed in accordance with and embodying the present invention for maintaining accurate voltage and phase control of the output of a three-phase generator with line to-neutral sensing of load-imbalance conditions. In this control system $A^2$ designates a conventional three-phase generator having three output lines 91, 92, 93, a neutral line 94, and a field winding 95 which is controlled by a conventional voltage regulator $21^b$ operating in precisely the same manner as the voltage regulator $21^a$. The control system $B^2$ includes transformers 96, 97, 98, respectively, having primary windings 99, 100, 101, which are, respectively, connected at one end with the output lines 91, 92, 93, and at their other ends to supply lines $S^7$, $S^8$, $S^9$, across which loads $L^7$, $L^8$, $L^9$, are connected in the usual manner.

Forming a part of the control system are three magnetic amplifiers 102, 103, 104, which are each respectively connected on one side to the supply lines $S^7$, $S^8$, $S^9$, in the manner shown in FIG. 3 through rectifier networks $n^4$, $n^5$, $n^6$. The magnetic amplifiers 102, 103, 104, are, respectively, provided with control windings 105, 106, 107, connected in common at one end or terminal by a common lead 108. The other end or terminal of the control winding 105 is connected to a common conductor 109 between the cathodes of diodes 110, 111. Similarly, the other end or terminal of the control winding 106 is connected to a common conductor 112 between the cathodes of the diodes 113, 114. Finally, the other end or terminal of the control winding 107 is connected to a common conductor 115 between the cathodes of the diodes 116, 117.

Also forming a part of the control system B² are three saturable reactors 118, 119, 120, and three inductors preferably of the linear reactor type 121, 122, 123. As shown in FIG. 3, the saturable reactor 118 and inductor 121 are connected in series with each other between the supply line S⁸ and one terminal of the secondary 124 of the transformer 96, the other terminal of which is connected to the supply line S⁷. A capacitor 125 is also connected across the terminals of the secondary 124. Similarly, the saturable reactor 119 and inductor 122 are connected in series with each other between the supply line S⁹ and one terminal of the secondary 126 of the transformer 97, the other terminal of which is connected to the supply line S⁸. A capacitor 127 is also connected across the terminals of the secondary 126. Finally, the saturable reactor 120 and inductor 123 are connected in series with each other between the supply line S⁷ and one terminal of the secondary 128 of the transformer 98, the other terminal of which is connected to the supply line S⁹. A capacitor 129 is also connected across the terminals of the secondary 128. The saturable reactors 118, 119, 120, are, respectively, provided with control windings 130, 131, 132, which are, respectively, fed by the output of the networks $n^4$, $n^5$, $n^6$. The output from the network $n^4$ controls the current flow through the saturable reactor 118 and the inductor 121. Similarly, the output of the network $n^5$ controls the current flow through the saturable reactor 119 and the inductor 122. Finally, the output of the network $n^6$ controls the current flow through the saturable reactor 120 and the inductor 123.

Also provided in the control system are three transformers 133, 134, 135, respectively, having center-tapped secondary windings 136, 137, 138, the center taps of which are connected by a common lead 139. The opposite ends or terminals of the secondary windings 136, 137, 138, are, respectively, connected to diodes 110—111, 113—114, and 116—117. The cathodes of the diodes 110, 111, are connected by the common conductor 109 to one terminal of a bleeder resistor 140 which is, in turn, connected at its other end to the common conductor 139. Similarly, the cathodes of the diodes 113, 114, are connected by the common conductor 112 to one terminal of a bleeder resistor 141, which is, in turn, connected at its other end to the common conductor 139. Finally, the cathodes 116, 117, are connected by the common conductor 115 to one terminal of a bleeder resistor 142 which is, in turn, connected at its other end to the common conductor 139. The transformers 133, 134, 135, are also provided with primaries 143, 144, 145, which are all connected by a common conductor 146 to the neutral line 94 and are respectively connected by conductors 147, 148, 149, to the supply lines S⁷, S⁸, S⁹.

In order to explain the operation of the control system B², it may be assumed that a load is imposed between the supply lines S⁷, S⁸, and that no load is imposed between the lines S⁸, S⁹, or between the lines S⁷, S⁹. In a normal generator system under the assumed conditions, the potential between the supply lines S⁷, S⁸, will become substantially lower than the average potential between the three supply lines S⁷, S⁸, S⁹.

Consequently, the D.C. potentials across the bleeder resistors 140 and 141 become lower than the average of the three D.C. potentials across all three of the bleeder resistors 140, 141, 142, which average appears on the common lead 108. Therefore, current flows from the diodes 116, 117, through the control winding 107, in a positive direction and from the diodes 110, 111, and 113, 114, through the control windings 105, 106 in a negative direction. The negative direction of current flow through the control windings 105, 106 is arranged to cause an increased current to flow from the rectifier networks of the magnetic amplifiers 102, 103, and, therefore, an increased current flows through the saturable reactors 118, 119, and the inductors 121, 122 in magnitude proper to restore balance.

Figure 4:
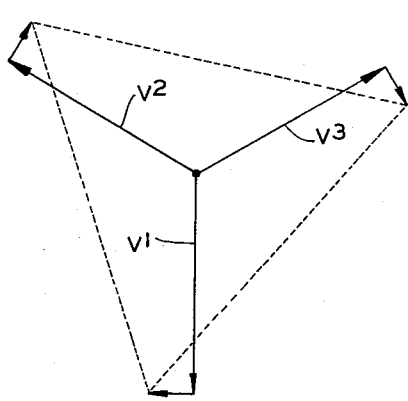
FIGS. 4 and 5 are vectorial diagrams illustrating the operation of the control system of the present invention.
Figure 5:
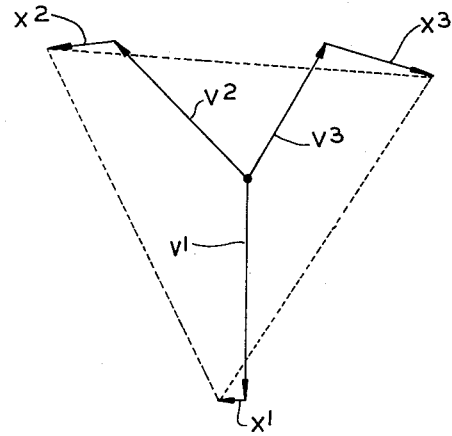

The electrical function of the control systems of the present invention can be illustrated vectorially as shown in FIGS. 4 and 5. Whenever a three-phase system is subjected to a balanced load across all three phases, the result may be vectorially illustrated as shown in FIG. 4, in which the voltages in the three phases are respectively designated by the vectors $V^1$, $V^2$, $V^3$, the essential characteristic being that the triangle shown in dotted lines be equilateral. On the other hand, in the case of an unbalanced load which would result in the vectorial deflection of FIG. 5, the control systems of the present invention will apply correction voltages as represented by the vectors $X^1$, $X^2$, $X^3$, so that the resulting triangle, as shown in dotted lines, is again equilateral. In the particular condition assumed above for explanatory purposes, a large correction is applied across the lines 1—2 or 37—38 or 91—92, as the case may be, in such a manner as to reduce the error between the potential across such lines and the average potential. In applying such a correction, an error is generally introduced across one of the other two lines, and this error is, in turn, corrected by an action similar to that described above, applied to this line. The corrections are not sequential, of course, but progress in a simultaneous manner. Thus, in the operation it is assumed that the voltage regulator acts first and in such a manner as to maintain the average potential constant at all times, except during transient intervals when a load has been applied or removed.

After application of a load and after the average voltage has been restored to values where the error is negligible, the individual line-to-line correction processes proceed as described. In general, the line-to-line correction processes are deliberately caused to take place at a slower rate than the voltage correction processes so that hunting or excessive transient over-corrections will not occur. As an example of the time for these processes to take place, a 30 kw. 400 cycle generator having output voltage controlled to one-half percent with respect to each other, and having the output voltage controlled to within one percent absolute, exhibited a .1 second recovery of average voltage after a load application and a 0.5 second recovery of line-to-line voltage when the load application was unbalanced. Actual numbers are dependent on the characteristics of the generator and these numbers are included for illustration only.

It should be understood that changes and modifications in the form, construction, arrangement, and combination of the several parts of the phase-balancing control systems for three-phase generators may be made and substituted for those herein shown and described without departing from the nature and principle of our invention.

Having thus described our invention, what we claim and desire to secure by Letters Patent is:

1. A control device for polyphase generating systems including an A.C. source having a plurality of lines representing separate phases, said control device comprising a power transference means connected to each phase and being adapted for deriving power from the A.C. source, and means for sensing differences in voltage-magnitude between the several phases of the output from the generating system, said means being adapted for applying a corrective signal to the power transference means of any phase which exhibits a difference in voltage-magnitude, whereby to cause such power transference means to introduce controlled amounts of derived power into the phase to which it is connected and thereby produce A.C. voltages in each phase which are balanced in magnitude with respect to each other.

2. A control device for polyphase generating systems including an A.C. source having a plurality of lines representing separate phases, said control device comprising a power transference means connected to each phase and being adapted for deriving power from the A.C. source, and means for sensing deviation in phase-angle between the several phases of the output from the generating system, said means being adapted for applying a corrective signal to the power transference means of whichever phase exhibits a deviation in phase angle, whereby to cause such power transference means to introduce controlled amounts of derived power into the phase to which it is connected and thereby produce A.C. voltages in each phase which are balanced in phase angles with respect to each other.

3. A control device for polyphase generating systems including an A.C. source having a plurality of lines representing separate phases, said control device comprising a power transference means connected across each phase and being adapted for deriving power from the A.C. source, and means for sensing differences in voltage-magnitude and deviations in phase angle between the several phases of the output from the generating system, said means being adapted for applying a corrective signal to the power transference means of any phase which exhibits a difference in voltage-magnitude and a deviation in phase angle, whereby to cause such power transference means to transfer controlled amounts of derived power into the phase to which it is connected and thereby produce A.C. voltages in each phase which are balanced in magnitude and phase angles with respect to each other.

4. A control device for polyphase generating systems having a plurality of lines representing separate phases, said control device comprising power transference means connected across each phase, and means for sensing differences in voltage-magnitude between the several phases of the output from the generating system, said means being adapted for applying a corrective signal to the power transference means, whereby to cause said transference means to transfer controlled amounts of power from one phase to another and thereby produce a polyphase alternating current having voltages in each phase which are balanced in magnitude with respect to each other, said power transference means including a series transformer operatively associated with each phase, said series transformers each having primaries which respectively are interposed in each phase in the line between the generator system and the load connected to such phase.

5. A control device for polyphase generating systems having a plurality of lines representing separate phases, said control device comprising power transference means connected across each phase, and means for sensing differences in voltage-magnitude between the several phases of the output from the generating system, said means being adapted for applying a corrective signal to the power transference means, whereby to cause said transference means to transfer controlled amounts of power from one phase to another and thereby produce a polyphase alternating current having voltages in each phase which are balanced in magnitude with respect to each other, said power transference means including a series transformer operatively associated with each phase, said series transformers each having primaries which respectively are interposed in each phase in the line between the generator system and the load connected to such phase, the series transformer of each phase also including a secondary connected between the line in which its primary is interposed and the power control means of such phase.

6. A control device for polyphase generating systems having a plurality of lines representing separate phases, said control device comprising power transference means connected across each phase, means for sensing differences in voltage-magnitude between the several phases of the output from the generating system, said means being adapted for applying a corrective signal to the power transference means, whereby to cause said transference means to transfer controlled amounts of power from one phase to another and thereby produce a polyphase alternating current having voltages in each phase which are balanced in magnitude with respect to each other, said power transference means including a series transformer operatively associated with each phase, said series transformers each having primaries which respectively are interposed in each phase in the line between the generator system and the load connected to such phase, the series transformer of each phase also including a secondary connected between the line in which its primary is interposed and the power control means of such phase, and a capacitor connected in parallel across each of said secondaries.

7. A control system for a polyphase generator having a field coil and a plurality of output lines representing separate phases; said control system comprising independent sensing means applied to each of the output lines for separately detecting a voltage difference between the phase to which it is applied and another phase, voltage regulator means applied simultaneously to all output lines for sensing the average of the voltages of all of the several phases and imposing a corrective voltage upon the field coil for maintaining constant the average voltage across all phases, and power transference means connected to each phase, such power transference means being adapted for deriving power from another phase, and being operatively regulated by the sensing means for introducing derived power of proper magnitude and phase angle into the respective output lines to compensate for phase and voltage deviations in the separate phases due to unbalanced loads.

8. A control system for a polyphase generator having a field coil and a plurality of output lines; said control system comprising a transformer in each phase, the primary thereof being in series with the output line of such phase, each of said transformers also including secondary means across which is connected a capacitor, said secondary means also being connected with the generator through a controllable impedance, control means in each phase responsive to changes in voltage within such phase, and voltage regulator means applied simultaneously to all output lines for sensing the average of the voltages of all of the several phases and imposing a corrective voltage upon the field coil for maintaining constant the average voltage across all phases, said control means being adapted for introducing corrective voltages of proper magnitude and phase angle into each output line to compensate for phase and voltage deviations in the separate phases due to unbalanced loads.

9. A control system for a polyphase generator having a field coil and a plurality of output lines; said control system comprising a transformer in each phase, the primary thereof being in series with the output lines of such phase, each of said transformers also including secondary means across which is connected a capacitor, said secondary means also being connected with the generator through a controllable impedance, control means in each phase responsive to changes in voltage within such phase, and voltage regulator means applied simultaneously to all output lines for sensing the average of the voltages of all of the several phases and imposing a corrective voltage upon the field coil for maintaining constant the average voltage across all phases, said control means being adapted for introducing corrective voltages of proper magnitude and phase angle into each output line to compensate for phase and voltage deviations in the separate phases due to unbalanced loads, each of said control means including a saturable reactor and linear reactance.

10. A control system for a polyphase generator having a field coil and a plurality of output lines; said control system comprising independent sensing means applied to each of the output lines for separately detecting a voltage drop in the phase to which it is applied, voltage regulator means applied simultaneously to all output lines for sensing the average of the voltages of all of the several phases and imposing a corrective voltage upon the field coil for maintaining constant the average across all phases, a separate voltage supply means connected to each phase, said voltage supply means being powered by the generator for supplying corrective voltage to each phase, and control means operatively regulated by the sensing means and connected to the several voltage supply means for adjusting said corrective voltages to the proper magnitude and phase angle whereby to compensate for phase and voltage deviations in the separate phases.

11. A control system for a polyphase generator having a field coil and a plurality of output lines; said control system comprising independent sensing means applied to each of the output lines for separately detecting a voltage drop in the phase to which it is applied, voltage regulator means applied simultaneously to all output lines for sensing the average of the voltages of all of several phases and imposing a corrective voltage upon the field coil for maintaining constant the average voltage across all phases, a separate voltage supply means connected to each phase, said voltage supply means being powered by the generator for supplying corrective voltage to each phase, and control means operatively regulated by the sensing means and connected to the several voltage supply means for adjusting said corrective voltage to the proper magnitude and phase angle whereby to compensate for phase and voltage deviations in the separate phases, each of said control means being connected across two output lines.

12. A control system for a polyphase generator having a field coil, a plurality of output lines, and a neutral line; said control system comprising independent sensing means applied to each of the output lines for separately detecting a voltage drop in the phase to which it is applied, voltage regulator means applied simultaneously to all output lines for sensing the average of the voltages of all of the several phases and imposing a corrective voltage upon the field coil for maintaining constant the average voltage across all phases, a separate voltage supply means connected to each phase, said voltage supply means being powered by the generator for supplying corrective voltage to each phase, and control means operatively regulated by the sensing means and connected to the several voltage supply means for adjusting said corrective voltages to the proper magnitude and phase angle whereby to compensate for phase and voltage deviations in the separate phases, each of said control means being connected by a common lead to the neutral line.

13. A control system for a polyphase generator having a field coil and a plurality of output lines; said control system comprising independent sensing means applied to each of the output lines for separately detecting a voltage drop in the phase to which it is applied, voltage regulator means applied simultaneously to all output lines for sensing the average of the voltages of all of the several phases and imposing a corrective voltage upon the field coil for maintaining constant the average voltage across all phases, a separate voltage supply means connected to each phase, said voltage supply means being powered by the generator for supplying corrective voltage to each phase, and control means operatively regulated by the sensing means and connected to the several voltage supply means for adjusting said corrective voltages to the proper magnitude and phase angle whereby to compensate for phase and voltage deviations in the separate phases due to unbalanced loads, said control means including a magnetic amplifier.

14. A control system for a polyphase generator having a field coil and a plurality of output lines; said control system comprising independent sensing means applied to each of the output lines for separately detecting a voltage drop in the phase to which it is applied, voltage regulator means applied simultaneously to all output lines for sensing the average of the voltages of all of the several phases and imposing a corrective voltage upon the field coil for maintaining constant the average voltage across the phases, a separate voltage supply means connected to each phase, said voltage supply means being powered by the generator for supplying corrective voltage to each phase, and control means operatively regulated by the sensing means and connected to the several voltage supply means for adjusting said corrective voltages to the proper magnitude and phase angle whereby to compensate for phase and voltage deviations in the separate phases due to unbalanced loads, said control means including a magnetic amplifier, a saturable reactor, and a linear reactor.

15. A control system for a polyphase generator having a field coil and a plurality of output lines; said control system comprising independent sensing means applied to each of the output lines for separately detecting a voltage drop in the phase to which it is applied, voltage regulator means applied simultaneously to all output lines for sensing the average of the voltages of all of the several phases and imposing a corrective voltage upon the field coil for maintaining constant the average voltage across all phases, a separate voltage supply means connected to each phase, said voltage supply means being powered by the generator for supplying corrective voltage to each phase, and control means operatively regulated by the sensing means and connected to the several voltage supply means for adjusting said corrective voltages to the proper magnitude and phase angle whereby to compensate for phase and voltage deviations in the separate phases due to unbalanced loads, said control means including a magnetic amplifier having a control winding connected to a source of D.C. current rectified from the phase with which the control means is associated.

References Cited in the file of this patent

UNITED STATES PATENTS

| | | |
|---|---|---|
| 2,546,725 | Crary | Mar. 27, 1951 |
| 2,808,519 | Rau | Oct. 1, 1957 |
| 2,938,128 | Logan | May 24, 1960 |